Figure 6:
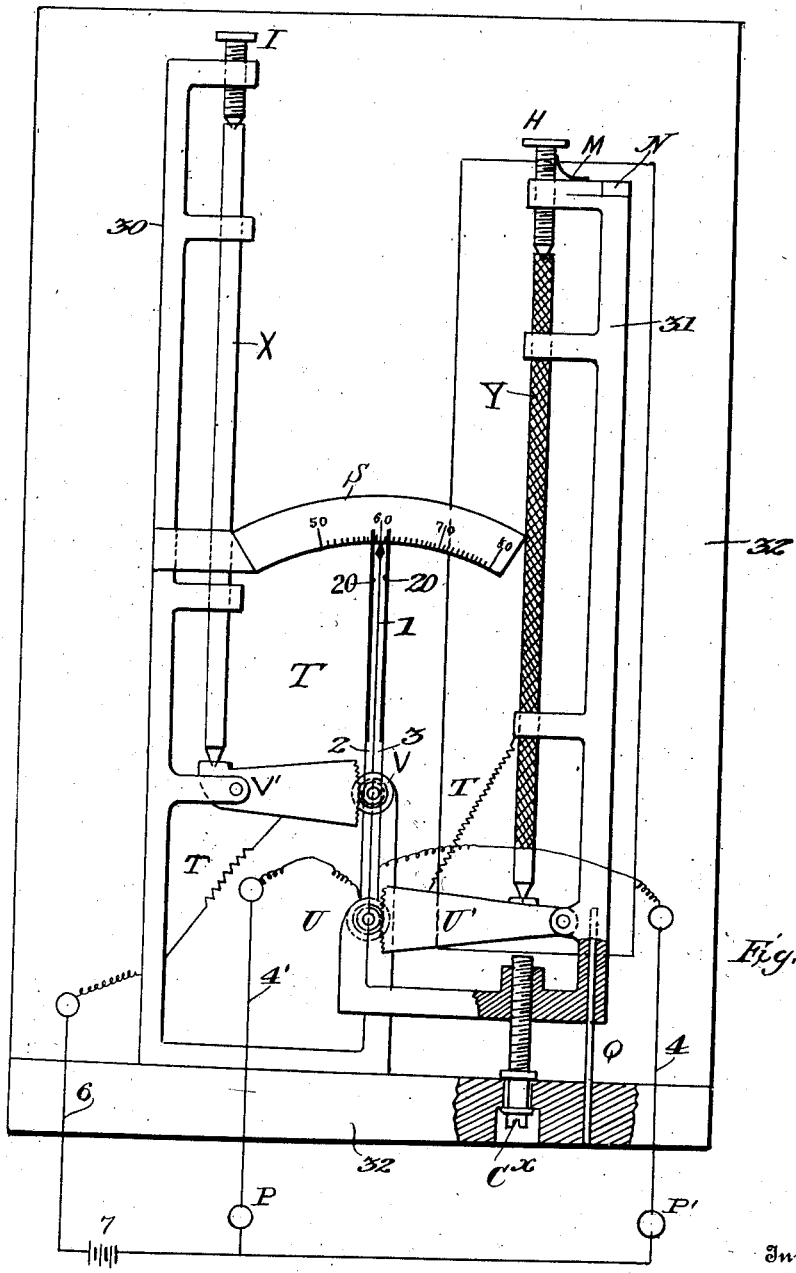

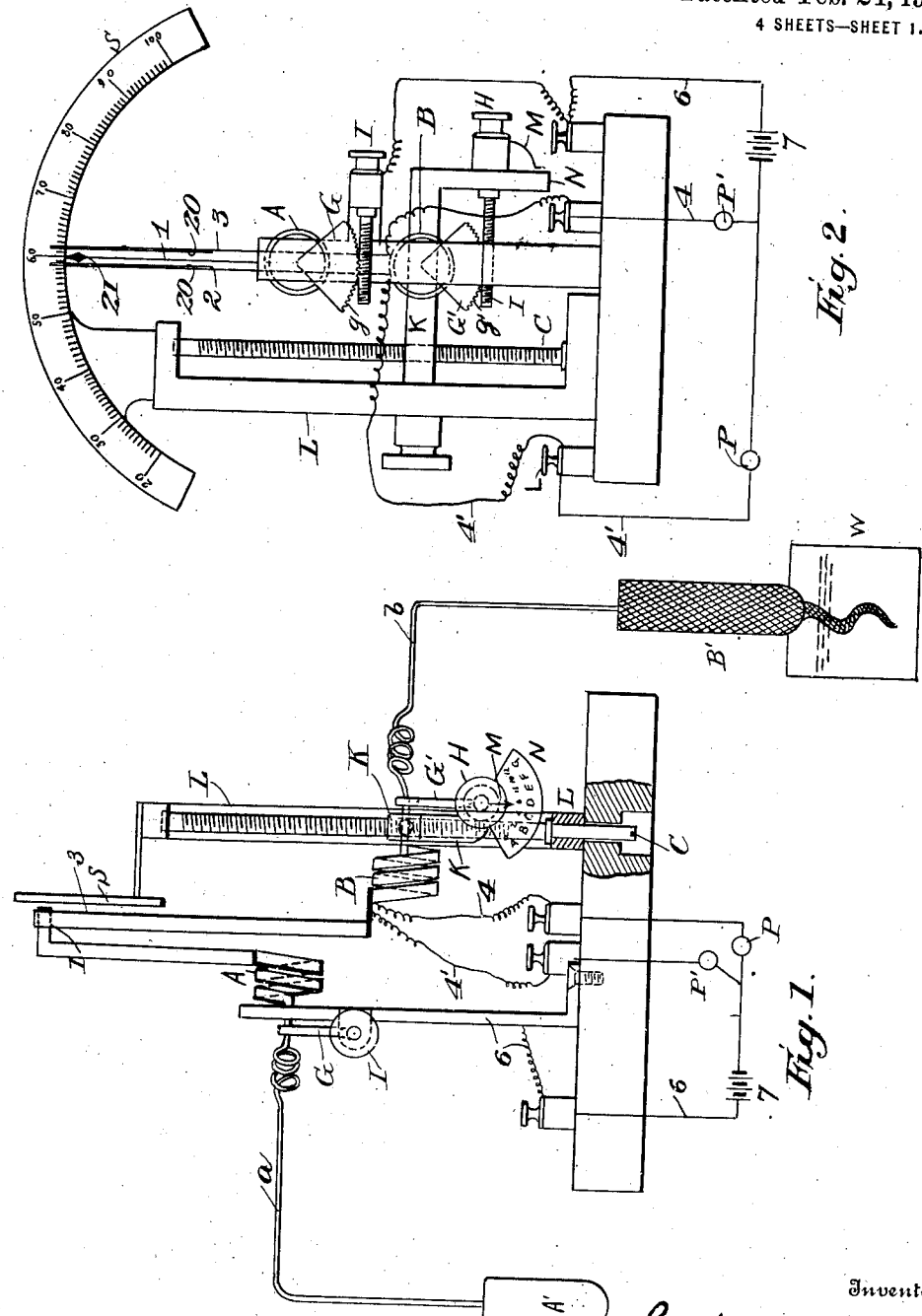

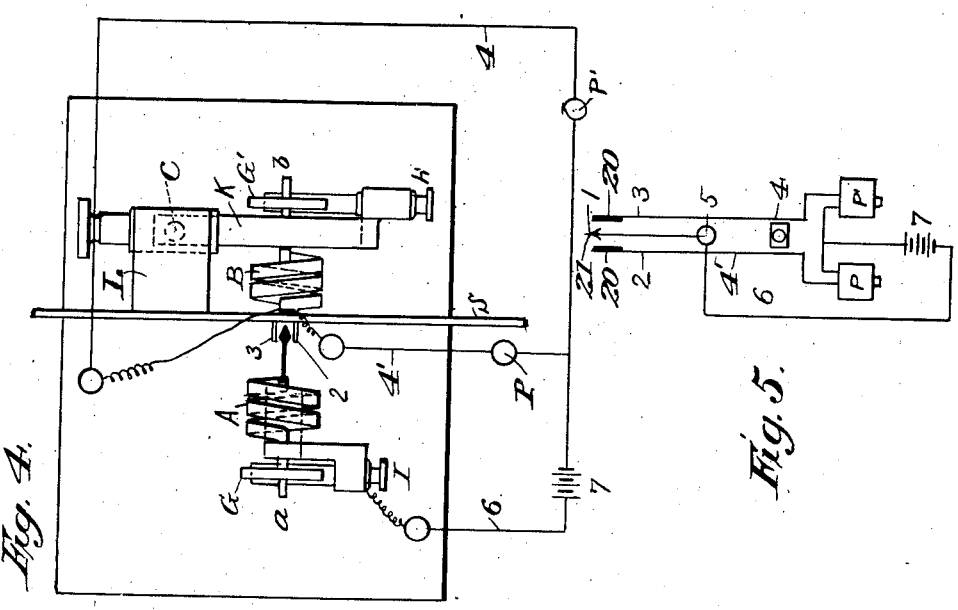
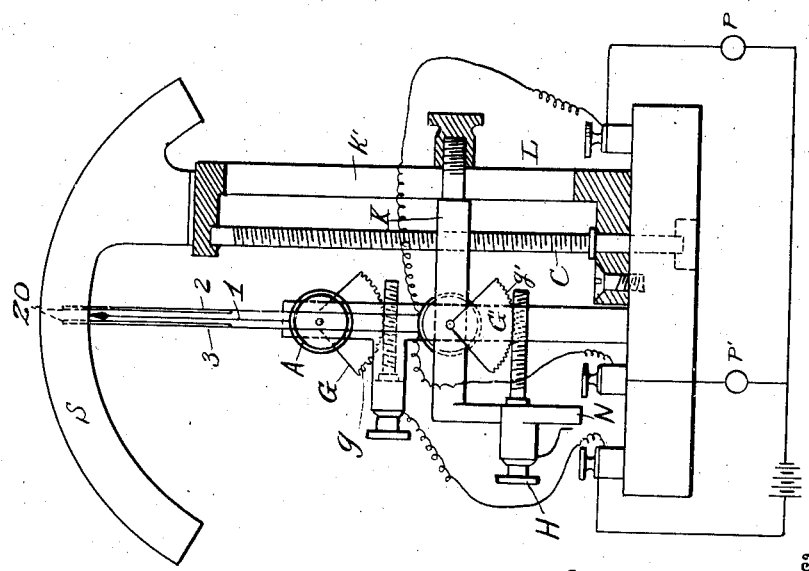

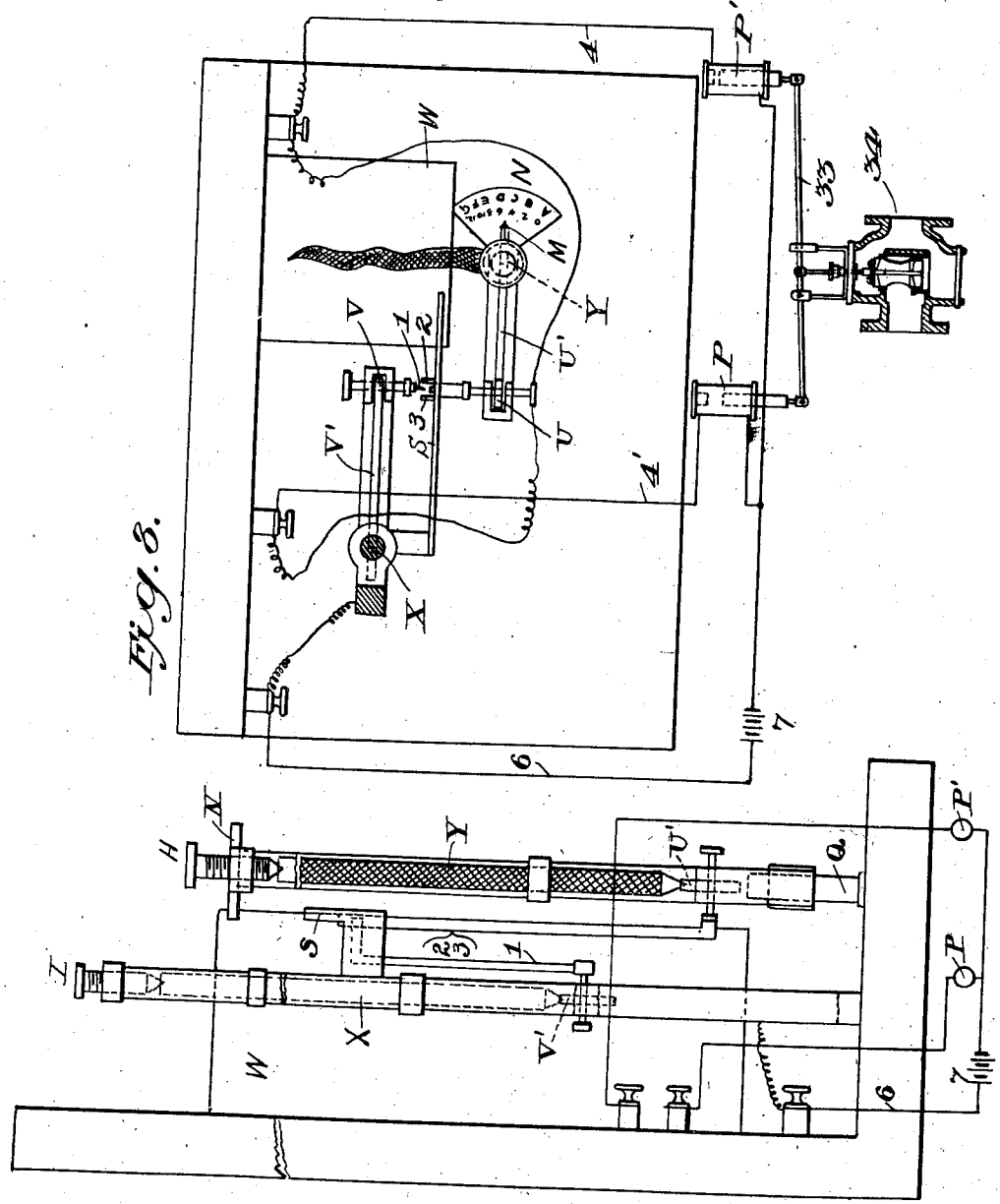

UNITED STATES PATENT OFFICE.

STUART W. CRAMER AND WILLIAM B. HODGE, OF CHARLOTTE, NORTH CAROLINA, ASSIGNORS TO PARKS-CRAMER COMPANY, OF FITCHBURG, MASSACHUSETTS, A CORPORATION OF MASSACHUSETTS.

HYGROMETER FOR REGULATING HUMIDIFYING AND HEATING SYSTEMS.

1,331,981.              Specification of Letters Patent.    Patented Feb. 24, 1920.

Application filed December 26, 1907. Serial No. 408,049.

*To all whom it may concern:*

Be it known that we, STUART W. CRAMER and WILLIAM B. HODGE, citizens of the United States, residing at Charlotte, in the county of Mecklenburg and State of North Carolina, have invented certain new and useful Improvements in Hygrometers for Regulating Humidifying and Heating Systems; and we do hereby declare the following to be a full, clear, and exact description of the invention, such as will enable others skilled in the art to which it appertains to make and use the same.

Our invention relates to instruments for automatically regulating the degree of moisture in the atmosphere in a factory or other building and in separate compartments thereof and its object is to produce improved and simplified apparatus for this purpose involving new and better facilities for manipulating and adjusting such apparatus to effect the desired control, as will hereinafter fully appear and be more particularly pointed out in the claims.

In the accompanying diagrammatic drawings, which form part of this specification:

Figure 1 represents a side elevation of a device embodying our invention, with parts in section;

Fig. 2 a front elevation omitting the reservoir B';

Fig. 3 a rear elevation, with parts in section;

Fig. 4 a plan view; and

Fig. 5 a diagrammatic plan of the electrical connections;

Fig. 6 a front elevation of a modification of the device with parts in section;

Fig. 7 a side elevation of the same, and

Fig. 8 a plan view with parts in section.

Reference being had to the drawings and the designating characters thereon A and B indicate flexible metallic spiral tubes, of the type used in ordinary pressure gages, fastened to sector-shaped parts G G' at one end and with the outer end free to move under differences in interior pressure, and to these outer ends are attached arms 1, 2 and 3, which serve the purpose of indicators and points for electrical contacts 20 and 21.

To the spiral B, at its fixed end is attached a section of flexible tubing $b$ having a small diameter, which at its outer end is connected to the reservoir B'. To the spiral A is also connected a similar reservoir A', by means of a small flexible tubing $a$. The reservoirs A' and B' are filled to a greater or less extent with alcohol, ether or some other liquid or gas, which has a definite rate of contraction and expansion for fixed decrements and increments in temperature. The spirals B and A together with the respective tubes $b$ and $a$ connecting them to the reservoirs B' and A' are made perfectly tight so that changes in temperature at B' and A' result in changes in vapor pressure in the spirals B and A. These resulting changes of pressure cause the arms of pointers 1, 2 and 3 to swing over a greater or less arc, depending upon the amount of this pressure, and it is easily seen, therefore, that the scale can be calibrated to indicate directly the temperature existing at the reservoirs B' and A'.

The sector-shaped part G, to which the spiral A is fastened, is provided with a worm-rack, engaged by tangent screw I, by means of which the position of the arm 1 attached to the outer end of the spiral A may be moved, although the pressure in the spiral itself remains constant. In other words, this tangent screw provides a simple means of changing the zero indication or position of the arm. In a corresponding way a similarly constructed tangent screw H controls the initial position of the arms 2, 3 through the medium of sector-shaped part G'.

The fixed end of spiral B and its sector-shaped part G' are mounted on a threaded bracket K, which can move up and down in a slot $k'$ in a standard or post L, by means of the adjusting screw C. This is for the purpose of changing the axial position of the two spirals with reference to each other for a purpose to be hereafter described.

By exposing the reservoir A' to the atmosphere, and by surrounding reservoir B' with a suitable covering, kept constantly moistened as is ordinarily done with a wet bulb thermometer, it is evident that we have the necessary elements to comprise an ordinary hygrometer and that the evaporation at the covering of the reservoir B' will cause a reduction of pressure in the spiral B which will result in a lower indication of the arms 2, 3 than is shown by the arm 1 which is attached to the free end of the spiral A. The operation of this instrument is as follows:

When it is desired to maintain any humidity corresponding to a given wet bulb depression, the tangent screw H is turned until the pointer M indicates this depression on the scale N. Provided now that reservoirs B' and A' are both at the same temperature, arm or pointer 1 will now make contact with the contact portion of arm 3 and these two arms will remain in this position, although reservoirs B' and A' are simultaneously carried through wide changes of temperature. But whenever the temperature of reservoir B' lowers sufficiently to correspond with the depression which the pointer attached to tangent screw H indicates, the contact referred to will be broken. And if this depression is carried still farther, contact will be made between the arm 1 and the contact portion of the wet bulb arm 2.

The contact portions 20 and 21 of the two lever arms 1 and 2, 3 respectively, constitute the means whereby the conjoint or differential effect of the two thermo-expansive elements A and B is made effective to control the moisture supply apparatus whereby the humidity in the room or compartment is made greater or less as circumstances may require. The electrical connections shown in the drawings include the electro-magnetic valve mechanism P and P' adapted to be actuated by a source of electrical energy to operate the valve mechanism. The contact between the movable arms thus closes and breaks the circuit in the obvious manner, so that the moisture supply apparatus will be in operation whenever the difference in temperature between reservoir B' and reservoir A' is greater than that indicated by the pointer M, and will be shut off whenever the depression has reached the required point.

With this arrangement it will be seen that throughout the whole length of the scale this fixed depression remains constant. Frequently, however, occasions arise where different depressions are desired at different temperatures and this can be readily accomplished by the adjustment provided in the screw C. For instance, if the spiral B is raised axially so that while it remains parallel, yet it is higher than the spiral A, then the contact portions of arm 2, 3 attached to spiral B will not move over so long an arc with equal change of temperature as will arm 1 attached to spiral A. In other words, the arm 1 and the corresponding contact portion of arm 2, 3, at which it makes contact, do not move at the same rate, and this rate may be varied within any desired limits and made either slower or faster than the travel of the arm 1 just as the axial position of spiral B is raised or lowered above the corresponding axis of spiral A.

The operation of the apparatus when the axis of spiral B is out of line with the axis of spiral A is the same as before, that is, the desired depression of the wet bulb would be adjusted by the tangent screw H and set according to some predetermined scale as shown by indicator M at some particular point of the scale S. Now, assuming that the axis of spiral B is above the axis of spiral A, the arm attached to B will move at a slower rate than the arm attached to spiral A and consequently as both arms move farther and farther up the scale the depression at the higher points of the scale will be greater than the initial fixed depression and the rate at which this depression varies can be changed as desired by the setting of the screw C.

The modification of the invention as shown in Figs. 6, 7 and 8, embodies thermo-expansive wet and dry bulb elements of the bar expansion type in place of the fluid containers of the form above described. As shown in these figures both bar elements are mounted on a base support comprising the standards 30, 31, and the base proper 32. Each element is mounted in one of the standards and their upper ends are attached or supported rigidly thereon so as to thrust against the rigid abutments provided by the set screws I and H respectively, while their opposite ends are adapted for individual movement according to changes of the temperature to which they are subjected. The expansion bar X represents the dry bulb element and its lower end thrusts against a lever in the form of a segment rack V' which is held up against it by means of a tension spring indicated by T. The gear teeth of the segment lever mesh with a pinion V journaled in an upstanding portion of the bracket 30, as shown in the drawings, and the pointer or arm 1 is mounted on the axle of the pinion to turn therewith. The other expansion bar constitutes the wet bulb element of the couple, for which purpose it is subjected to the wet bulb temperature of the air, for instance by being covered with a wicking, as indicated, the wicking being moistened from the tank W shown in Fig. 8. Its lower end actuates a segment rack or lever U' and the pinion U meshing therewith in the same manner as the dry bulb element actuates its segment lever and pinion. A similar spring T serves to hold the lever U' tight against the end of the bar. The arm or pointer 2, 3 is carried on the axle of the pinion U and coordinated with the arm 1 in the same manner as above described, in reference to the form of Figs. 1 to 4, and as indicated by the drawings.

The portion of the base support constituted by the wet bulb standard 31 is adjustably mounted with reference to the rest of the apparatus whereby the pivotal axes of the contact arms may be adjusted relatively to one another in the same manner as the spirals A and B above described. A suitable set screw C$^x$ and a guide-rod Q represent the means for this adjustment. Further adjustment of the wet bulb element is accomplished by means of the set screw H, which bears a pointer M extended over a scale plate N, as shown more clearly in Fig. 8. The bars X and Y can consist of zinc or any other suitable metal while the base support and standards can be made of a suitable metal with practically zero coefficients of linear expansion. As these bars vary in length through change of temperature, they act on their respective lever systems which in turn swing the contact arms through an arc and over the scale S, quite the same as in the pressure type of instrument above described. The radial positions of the contact arms are adjusted by the set screws I and H exactly as in the preceding case. Their axial position is further adjusted by the set screw C$^x$ corresponding to the screw C in the pressure type of instrument.
Referring now to the diagram of the circuit connections, as shown by Fig. 5, and which applies to both illustrations of the invention, the source of electrical energy is represented by 7, one terminal of which is connected by conductor 6 to the junction point 5 of the arm attached to the dry bulb element (whether that be the element X or the element A). The contact portions 20 of the wet bulb element are connected through the wires 4' and 4 respectively with the valve mechanism diagrammatically indicated in this figure by P and P' and which are arranged to start and stop the moisture supply to the room under regulation, the other terminals of these mechanisms being connected as indicated to the opposite pole of the source of current.

In Fig. 8 we have shown a suitable form of execution of the electro-magnetic moisture varying valve mechanism diagrammatically represented in Fig. 5. Here the parts P and P' corresponding to the similarly lettered parts of Fig. 5, are solenoids connected by a lever 33 to actuate a valve mechanism 34 of usual construction, which will be obvious to those skilled in this art and will therefore not require description. The construction of this valve mechanism forms no part of the present invention, it being understood that its function is merely to control the admission or supply of moisture to the room to be controlled.

This valve mechanism which is operated by the external source of energy, through the controlling agency of its differentially operated connecting means with the two thermal elements, is herein referred to as the moisture-varying mechanism or apparatus meaning thereby the instrumentality immediately in control of the supply of moisture to the room under regulation. The said differential connecting means comprehends the circuit wires and the contact members 20 and 21, which by their mutual engagement and disengagement, control the flow of energy to the moisture-varying mechanism. Such contacting and separating members are herein referred to as the humidity controlling device or the energy controlling device, being an agency directly and differentially operated and moved by the thermally developed forces of the wet and dry bulb elements to set in action a larger force for moving the moisture-varying mechanism. This is the identifying characteristic of the said device. The action of the thermal elements upon said device is solely and purely differential in that every increment of thermal change of one element, in a direction to turn the moisture on or off, tends to neutralize the effect of every corresponding increment, in the same sense, of the other element, and no actuation of the humidity controlling device can occur except as the result of a true difference in the effective movements of the two elements. The effect is to give accuracy of control under all possible conditions and combinations of temperature and humidity change.
It will be noted that the extent to which one thermal increment tends to neutralize the other is in proportion to the effective length of the lever arm of the pointers 1 and 2, 3 as controlled by the manipulation of the screw C or C$^x$, that is to say, the raising or lowering of the frame of element Y (in Figs. 6 to 8) produces engagement of the two contact members at points nearer to or remoter from the fulcrum of lever 2, 3 according to the direction of adjustment and thereby operates to control the relative effect of each thermal element upon the humidity controlling connections so that the wet bulb depression, under changing room temperatures, may be constant or variable, or variable according to different scales as desired. For example, screw C or C$^x$ may be set to make the instrument regulate the room humidity so that no matter what temperature may be indicated by a dry thermometer the wet bulb thermometer will always show a temperature lower by a fixed amount say 10 or 12°. This is called regulation according to a constant depression and is a kind of regulation frequently desired and permitted by this instrument, but which does not represent a constant relative humidity, nor even a constant weight of water vapor in each cubic foot of air. The screw C or C$^x$ may also be set to cause the instrument to regulate the room condition so that as the dry bulb temperature rises, the depression will not remain constant but will change in value, which is also a kind of regulation frequently desired and permitted by this instrument. If the depression increases in the rate of approximately one degree F. (roughly speaking) for every 10 degrees increase of dry bulb temperature, the result will be to keep a condition of constant relative humidity in the room air for all dry bulb temperatures. If the rate is somewhat less than this, the character of the resulting regulation will be suited to the hygroscopic peculiarities of cotton fibers in such a way as to keep always in each fiber substantially the same percentage of moisture and with other materials similar rates of changing depression are most suitable and all of them are provided by the effect of screw C or $C^x$ which as already pointed out is merely a means of varying the effective movement imparted by one thermal element as compared to the other. The observation may be made that the ratio of the effective movements of the elements is specifically proportional to the ratio of the lever effects exerted by them on the humidity controlling connections which is a simple statement of the action of the specific mechanism above described.

The screw H, in both illustrations of the invention provides an adjustment which is supplemental to the adjustment of the relative effects of the thermal elements on the energy controlling device and its function is to change the initial value of the depression to suit the occasion. For example, if the screw C or $C^x$ is set for regulation on a constant depression scale, screw H is set to indicate the amount of such depression which will thereafter be maintained automatically by the instrument. If the screw $C^x$ is set for regulation on some other scale (having a variable depression) then the screw H is set to indicate the proper depression for that scale at the dry bulb temperature then prevailing. In either case its function is to control the amount or value of the initial depression which is effected by changing the mechanical relation of one element to the energy controlling device which as already defined amounts to a change in the zero setting of the instrument. In Figs. 1 to 5, this change of the mechanical relation is done by effecting a slight change in the position of the arm 2, 3 which connects the contact members 20 with the thermal elements and without changing the position of the wet bulb receptacle; in Figs. 6 to 8 it is effected by bodily shifting the position of the wet bulb element in its entirety. In both cases the result is the same.

It will be further observed that the two thermo expansive elements, in both illustrations, are separately supported and independently active upon the humidity controlling connections, each exerting its expansive effort directly thereon, that is to say, not through the intervention of the other expansive element, and each element is thus the least affected by the temperature to which the other is subjected, and can be adequately spaced from the other without insulation which may impair sensitiveness.

It is to be further noted that in both illustrations of the invention the parts which support the contacting members 20 and 21 are of slender form and therefor adapted to yield resiliently during the adjustment of the wet bulb depression, under the manual force applied through the adjusting screw, so that after one of said members has been moved until it makes contact with the other, both contacting members are thereafter moved as a unit and remain in that condition until the moisture condition corresponding to the new adjustment has been attained. Such provisions for yield are particularly useful in the bar expansion form of the instrument.

Some of the features herein above disclosed, particularly the use of vapor pressure in differential relation and other related features, form the subject of a divisional application filed September 14, 1911, Serial No. 649,224.

Having thus fully described our invention, what we claim is—

1. In apparatus for regulating humidity, two movable controlling members adapted for mutual coöperative engagement and having suitable connections for controlling the moisture supply, in combination with a wet-bulb thermo-expansive element connected to impart movement to one of said members and a dry-bulb thermo-expansive element connected to impart movement to the other of said members, the organization of said elements and members being such that mutual engagement of the said members is produced by their simultaneous but different movement in the same direction.

2. In apparatus for regulating humidity, two movable controlling members adapted for mutual engagement and having suitable connections for controlling the moisture supply, in combination with wet and dry bulb thermo-expansive elements respectively connected to impart movement to said controlling members and means for adjusting the initial positions of the said members relative to each other in accordance with the desired temperature depression between said wet and dry bulb elements.

3. In apparatus for regulating humidity, two movable controlling members adapted for mutual engagement and having suitable connections for controlling the moisture supply, in combination with wet and dry bulb thermo-expansive elements respectively connected to impart simultaneous movement to said members in the same direction under increasing or decreasing temperature changes and means for varying the rate of the relative motion of said controlling members.

4. In apparatus for regulating humidity, two movable controlling members, one of said members being provided with opposed electrical contact portions and the other being adapted for alternate engagement therewith, electrical circuits controlled by such engagement and containing suitable translating devices for restricting and increasing the moisture supply, in combination with wet and dry bulb thermo-expansive elements respectively connected to impart simultaneous movement to said controlling members in the same direction under increasing or decreasing temperature changes.

5. Apparatus for regulating humidity comprising moisture-varying valve mechanism, wet bulb and dry bulb thermal elements having differentially operated means for controlling said mechanism, each of said elements being mounted to exert its expansive effort independently of the expansion of the other element and means for adjusting the aforesaid differentially operated means to control the relative effects of the thermal elements in their action thereon and thereby adapt the apparatus to produce different humidity effects.

6. Apparatus for regulating humidity comprising moisture-varying valve mechanism, wet bulb and dry bulb thermo-expansive elements having differentially operative lever means for controlling said valve mechanism, and means for adjusting the ratio of the lever effects through which said elements act to correspond to a desired rate of change of wet bulb depression under changing temperatures.

7. Apparatus for regulating humidity comprising two thermo-expansive elements respectively subjected to the wet and dry bulb temperatures of the air, a movably mounted rack adapted to be moved by the expansion and contraction of each of said elements, a pinion engaged by each of said racks, a moisture varying mechanism, and means connecting the same for control by the differential action of said pinions.

8. Apparatus for regulating humidity comprising two thermo-expansive elements respectively influenced by the wet and dry bulb temperatures of the air, a segment gear actuated by each element, a pinion actuated by each segment and an arm actuated by each pinion, said arms being organized to coöperate in the control of the humidity.

9. Apparatus for regulating humidity comprising suitable supporting means and two thermo-responsive elements supported thereon independently of each other and respectively subjected to the wet and dry bulb temperatures of the air, moisture-varying mechanism operatively connected with said elements and controlled solely by the differential action thereof and means for manually altering the mechanical relation of said elements to change the initial wet bulb depression of the apparatus.

10. Apparatus for regulating humidity comprising suitable supporting means and two thermal elements supported thereon for expansion and contraction independently of each other and respectively subjected to the wet and dry bulb temperatures of the air, moisture-varying mechanism having means connecting it with said elements to be controlled solely by the differential expansion or contraction thereof, adjustment means for varying the relative effects of said elements on said means, and means for altering the initial wet bulb depression of the apparatus.

11. Apparatus for regulating humidity comprising two thermo-expansive elements respectively influenced by the wet and dry bulb temperatures of the air, a lever arm for each of said elements adapted to be moved by the expansion and contraction thereof, one of said elements and its lever arm being jointly movable with respect to the other, in combination with suitable apparatus for varying the moisture in the air connected with and operated by the differential action of said arms.

12. Apparatus for automatically regulating humidity comprising two independently mounted thermo-expansive members each arranged to separately respond to the temperature to which it is subjected, a lever system operated by such elements, an external source of power controlled solely by the differential action of such lever system and a moisture valve adapted to be turned on or off by said power.

13. In apparatus for regulating humidity, a base or support, a dry bulb expansive element and a wet bulb expansive element, one end of each element being attached to said base support, means for adjusting the attached end of one of said elements relatively to the base support and thereby variably adjusting the initial wet bulb depression, a moisture supply valve, and means controlled solely by the differential expansion or contraction of said elements for opening and closing said valve upon predetermined changes in humidity.

14. In apparatus for regulating humidity, a device for controlling a source of energy, a moisture varying apparatus actuated by such energy, wet and dry bulb thermo-expansive elements each adapted to impart its own movement directly to said device and means for varying the value of the effective movement of one element relative to that of the other element.

15. In apparatus for regulating humidity, a device for controlling a source of energy, a moisture-varying mechanism operated by such energy, a wet bulb thermo-expansive element, a dry bulb thermo-expansive element, a base to which both of said elements are independently connected, connecting means whereby each of said elements directly actuates the said energy controlling device solely according to the differential movements of said elements, means for varying the initial wet bulb depression and means for variably and relatively adjusting the degree of actuation effected by such elements.

16. In apparatus for regulating humidity, a dry bulb element, a wet bulb element and a rigid base to which one end of each element is separately secured, in combination with moisture controlling apparatus to which the other ends of said elements are differentially connected and means for altering such differential connecting means of said elements to increase the effect of one of them upon the said apparatus relatively to that of the other.

17. In apparatus of the kind described a moisture control valve having a source of energy to operate it and a device in control of such energy and valve, in combination with wet and dry bulb thermo-expansive elements and means whereby such elements operate said energy-controlling device by their expansive movement, such means including a lever and means whereby the leverage effect thereof may be altered to vary the relative effects of the wet and dry bulb expansions.

In testimony whereof we affix our signatures in presence of two witnesses.

STUART W. CRAMER.
WILLIAM B. HODGE.

Witnesses:
R. I. DALTON, Jr.,
JNO. C. WATSON.